UNITED STATES PATENT OFFICE.

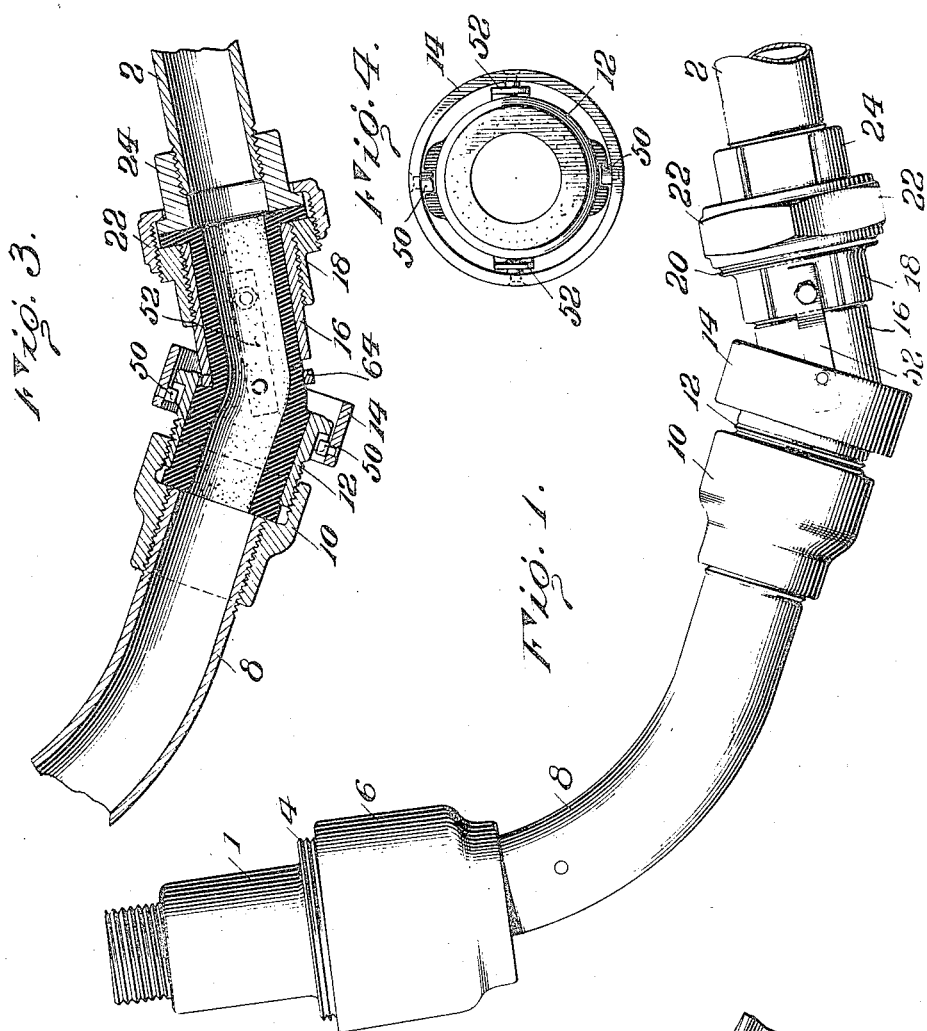

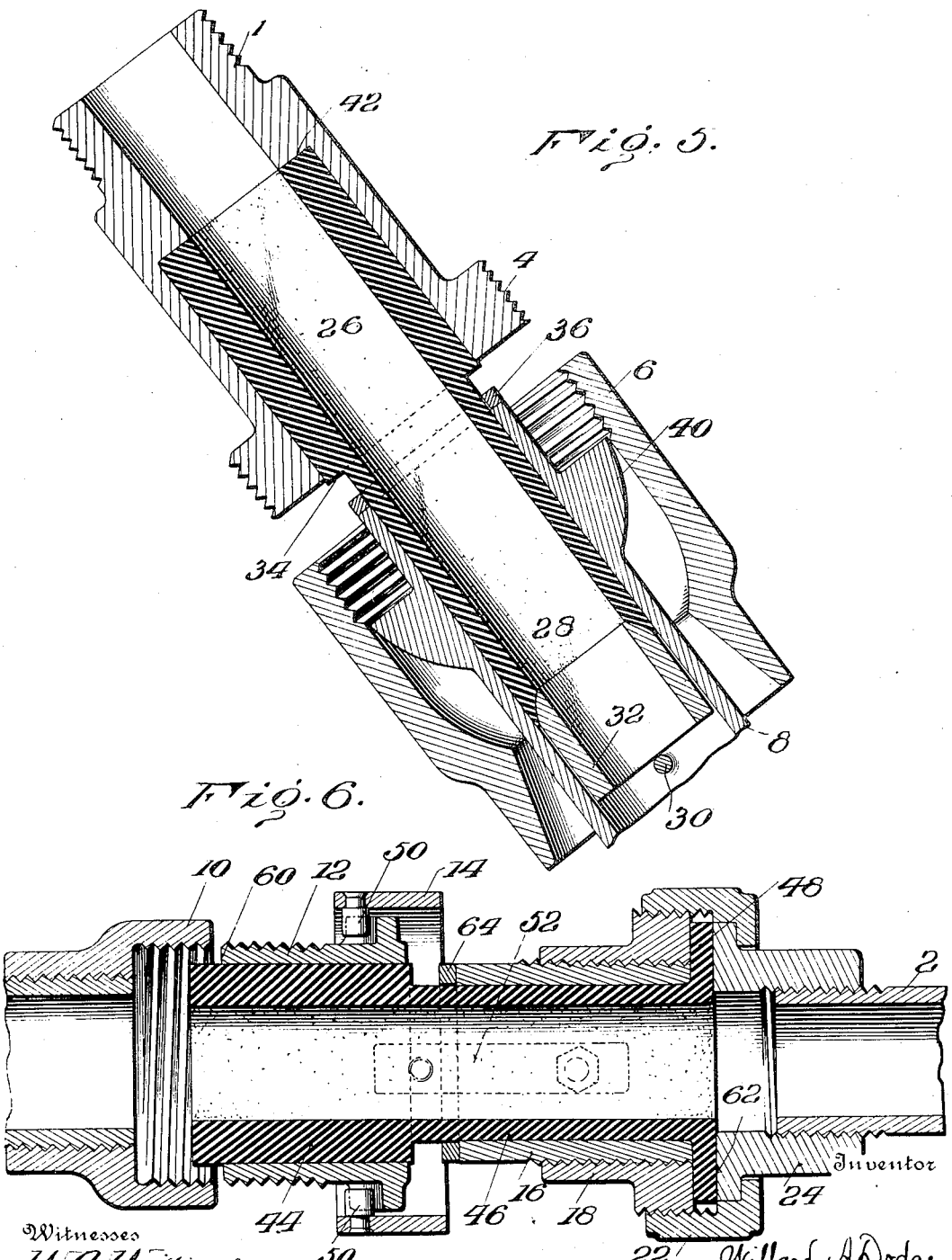

WILLARD A. DODGE, OF HORNELL, NEW YORK.

FLEXIBLE PIPE CONNECTION.

1,138,281. Specification of Letters Patent. Patented May 4, 1915.

Application filed April 30, 1914. Serial No. 835,490.

*To all whom it may concern:*

Be it known that I, WILLARD A. DODGE, a citizen of the United States, and a resident of Hornell, in the county of Steuben and State of New York, have invented certain new and useful Improvements in Flexible Pipe Connections, of which the following is a specification.

This invention relates to improvements in flexible pipe connections of that character in which there are two or more metal sections connected together by a piece of hose of vulcanized rubber or other suitable material.
The object of the present invention is to so connect the metal members with the hose member that the hose will be both compressed and confined. In other words, in the preferable embodiment of my invention, the hose is of a longer length than the distance between the metal sections so that when the metal sections are secured together the hose will be shortened in length, thereby compressing the same.
The invention consists in the construction and arrangement hereinafter more particularly described and then definitely claimed.

In the drawings accompanying and forming part hereof: Figure 1 is a side elevation of a pipe connection made in accordance with my invention. Fig. 2 is a sectional view of one end of the connection. Fig. 3 is a sectional view of the other end of the connection. Fig. 4 is a section through the universal joint shown in Fig. 3. Fig. 5 is a sectional detail, slightly separated, to show the action of the hose. Fig. 6 is a similar view of the other end of the coupling.
Referring now to the details of the drawings by numerals: 1 and 2 designate the pipe connections to be connected by the flexible pipe connection. As indicated in Fig. 2, the member 1 has an enlarged screw threaded end 4 which screws into a socket member 6 loosely connected to the end of a pipe section 8. The other end of this pipe section 8 has an enlarged socket member 10 which screws onto one section 12 of a universal joint, this section 12 being loosely connected to a second section 14 of the universal joint, which in turn is connected to the third section 16 and 18 of the universal joint. The member 18 is screw threaded as indicated at 20 and screws into a ring nut 22 which forms a connection for a member 24 screwed onto the pipe connection 2. I have thus referred generally to the parts as appear from the exterior in Fig. 1 and will now refer to the details of the various parts.

The pipe section 1 which has been described as having an enlarged screw threaded end 4 has an enlarged opening 5 therein which is designed to receive one end of a piece of hose 26 of vulcanized rubber or other suitable material. This hose 26 has its bore of the same size as the smaller opening in the pipe connection 1 and on the exterior is made of two diameters, the larger section fitting the bore 5 of the pipe connection 1, while the section 28 extending out of pipe connection 1 is of smaller diameter on the exterior. This smaller end 28 is adapted to be inserted within the pipe section 8. The latter is provided with a pin or stop 30 against which abuts a collar 32 preferably made of lead or other soft metal and it may be easily slipped in position within the pipe section 8 before the hose 28 is placed therein. The collar 32 has one end beveled on its exterior, as indicated in Fig. 2, while the interior of the hose section 28 is similarly beveled on the interior so that the end of the hose section may be wedged between the bevel of the collar 32 and the interior wall of the pipe section 8. That part of the hose section 28 which normally extends out of the pipe section 1 and which fits within the pipe section 8 is of greater length than the space within said pipe between the collar 32 and the end of the pipe. Therefore, when the hose section 28 is inserted in the pipe section 8, there will be a space left between the shoulder 32 of the enlarged part 26 of the hose section and the end of the pipe section 8. Therefore, as the parts are screwed home, it is possible for the hose section 28 to be shortened in length as will be hereinafter explained. Between the aforesaid shoulder 34 and the end of the pipe section 8 is located a ring 36 preferably formed of brass, or softer metal if preferred, the inner surfaces of which are slightly rounded as indicated in Fig. 5. The pipe section 8 has one member 38 of a ball and socket joint secured to it. This member 38 may be secured to the pipe section 8 as indicated in Fig. 2, or it may be formed integrally therewith, as indicated at 40 in Fig. 5. One side of this member 38 is formed spherically so that it may be seated within the socket member 6 as clearly seen in Figs. 2 and 4. This socket member 6 has an enlarged opening in one end through which the pipe section 8 may have motion as the spherical member 38 turns within the socket member as occasion may require.

After the parts are placed in the position shown in Fig. 5, the socket member 6 is screwed onto the enlarged end 4 of the pipe connection 1. When the part 6 is screwed home, the space between the shoulder 34 and the end of the pipe section 8 will have disappeared. In fact, the two parts are arranged to be screwed together to such an extent that the hose section 28 will be materially compressed between the part 8 and the abutment formed by the shoulder 42 within the pipe section 1. Hence the hose section 28 is materially reduced in length, whereby it is held under compression endwise. It will also be manifest that it is confined laterally within the pipe section 8. The construction is such that no matter how often or how much the spherical member 38 is turned within the socket member 6, the hose connection 28 is always under tension. For instance, if the parts are moved as indicated in Fig. 2, that part of the hose connection shown in the right hand side of said figure will be compressed slightly more than it would be if the coupling were in a straight line, while the left hand side is somewhat open. Nevertheless, the hose section 28 has been so compressed within the pipe section 8 that even at the left hand side where the pipe section 8 has moved away from the enlarged end 4 of the pipe section 1, the hose section is still under compression. I deem this an important feature of my invention for the hose is never stretched at the point of strain. The ring 36 before referred to is for the purpose of partially filling the space between the shoulder of the enlarged hose section 26 and the end of the pipe section 8 and also for the further purpose of restraining the rubber hose section at this point and preventing it from bursting. The other end of the section, that having the universal joint, is formed on the same principle, i. e., the rubber hose section therein contained is also longer than the space in which it fits so that the hose section is always under compression. Referring to this universal joint of the connection,—the enlarged socket end 10 is arranged to receive an enlarged end 44 of a hose section, the other part 46 of which is formed of smaller external diameter and is provided with an annular flange 48. The socket member 10 is arranged to have screwed into it one section 12 of the universal joint, this section being pivotally connected to the second section 14 of the universal joint by means of the pivots 50 shown in Fig. 6. The second member 14 of the universal joint is connected by means of links 52 with the third section 18 of the universal joint, this section 18 being screwed into the ring nut 22 connected with the member 24 projecting from the pipe section 2, all as indicated in Fig. 6.

The construction just described is such that before the parts are screwed home, the distance between the end 60 of the first universal joint member 12 and the wall 62 of the member 24 is considerably shorter than the length of the hose section 44 and 46 so that when the socket member 10 is screwed onto the member 12, the rubber hose section is thereby shortened to the extent that the socket member is screwed onto the member 12. Inasmuch as the member 46 of the hose section is the part most easily compressed, it follows that this part is compressed until the surplus space is entirely taken up. However, a ring 64 is located around the reduced part 46 of the hose section for the same purpose that the ring 36 hereinbefore referred to is employed. When the parts are screwed home, the space illustrated in Fig. 6 between the enlarged end of the hose 44 and the ring 64 is entirely closed so that the hose section 46 is considerably compressed. At the same time, it will be noticed that the compressed part of the hose 46 is likewise held confined laterally by means of the section 16 projecting from the member 18 of the universal joint.

It follows from the construction described and illustrated that when either member of the universal joint is moved, the hose section 46 of smaller diameter will accommodate the desired movement. The parts are shown in Fig. 3 as having been moved. Thus it is seen that the upper side of the hose section is still further compressed, while the under section is drawn out so that the space surrounded by the ring 64 is greatly increased. However, it is not increased sufficiently to relieve the hose section from compression but even when moved to the extreme extent shown in Fig. 3, there is no stretching of the parts of the hose section. Of course there would be a stretching at this point were it not for the fact that the hose section is so much decreased in length by being shortened as it is compressed into position. It will be evident that the ring 64 serves the same functions as the ring 36 hereinbefore referred to, that is to say, the ring partially fills the space caused by the opening up of the joint and at the same time forms a circling band of metal to confine the hose and thereby prevent any tendency to burst.

It is obvious that changes may be made in the form and construction of my invention without departing from the essential features, the patentable points of which are set forth by the appended claims. As one example, I might refer to the fact that I have only described the smaller part of the hose section as being compressed but it will be manifest that the part of larger diameter may also be longer than the opening into which it fits so that both parts of the hose section will be compressed. Of course the part of smaller diameter will be compressed the most on account of its being of less thickness than the larger part. The compression of the rubber lengthwise against the collar 32, combined with the internal pressure of the fluid within the hose section, and particularly on the inside of the part of smaller diameter, will press the rubber against the interior of the pipe and prevent leakage—thus the greater the internal pressure and the greater the compression of the rubber lengthwise, the tighter the joint becomes.

What I claim as my invention is:

1. In a pipe connection, the combination of two rigid members positively connected together but movable freely at an angle with respect to each other, a hose section having its ends located in said rigid members and forming a tight joint between said rigid members, and said hose section being of greater length, before insertion, than the space within which it is compressed, whereby when the connection is bent at an angle the hose section is not unduly stretched at the point of bend.

2. In a pipe connection, the combination of two rigid members positively connected together but movable freely at an angle with respect to each other, a hose section between said rigid parts forming a tight connection and being confined laterally, and said hose section being of greater length, before insertion, than the space within which it is compressed and confined, whereby when the connection is bent at an angle the hose section is not unduly stretched at the point of bend.

3. In a pipe connection, two rigid parts positively connected together but movable with respect to each other, in combination with a hose section between said rigid parts, said hose section having two parts formed of different diameters and being of greater length, before insertion in the connection, than the space into which it is compressed.

4. In a pipe connection, two rigid parts positively connected together but movable with respect to each other, in combination with a hose section between said rigid parts, said hose section when in normal position being confined laterally and having two parts formed of different diameters of greater length, before insertion in the connection, than the space into which it is compressed.

5. In a pipe connection, two rigid parts connected together by a ball and socket joint, whereby one of the parts may move with respect to the other, in combination with a hose section located within said ball and socket joint, said hose section being compressed lengthwise thereof so that when the parts of the ball and socket joint move with respect to each other, the hose section is not unduly stretched at the point of bend.

6. In a pipe connection, two pipe sections, one having a spherical shaped member thereon and the other having a socket secured thereto co-acting with the spherical shaped member, whereby one of said sections may move with respect to the other, in combination with a hose section connecting the pipe sections, and permitting the parts of the ball and socket joint to move with respect to each other, said hose section being compressed lengthwise thereof so that when the parts of the ball and socket joint move with respect to each other, the hose section is not unduly stretched at the point of bend.

7. In a pipe connection, two pipe sections, one having a spherical shaped member thereon and the other having a socket co-acting with the spherical shaped member, whereby one of said pipe sections may move with respect to the other, in combination with a hose section connecting the pipe sections, said hose section having two parts formed of different diameters one of said parts being confined in one pipe section and the part of smaller diameter being confined in the other pipe section, the pipe section inclosing the part of smaller diameter abutting against the shoulder formed by the part of larger diameter, and said hose section being of greater length before insertion in the connection than the space into which it is compressed, whereby one of said pipe sections may move with respect to the other without stretching the hose section.

8. In a pipe connection, two pipe sections, one having a spherical shaped member thereon and the other having a socket co-acting with the spherical shaped member, one of said pipe sections having an opening of larger diameter than the other and the one of smaller diameter having a tapered ring therein, in combination with a hose section connecting the pipe sections, said hose section having two parts formed of different diameters, the part of larger diameter being confined in the pipe section having the larger diameter and the part of smaller diameter being confined in the section having the tapered ring, and said section abutting against said tapered ring and being of greater length before insertion in the connection than the space into which it is compressed, whereby one of said pipe sections may move with respect to the other without stretching the hose section.

9. In a pipe connection, two pipe sections, one having a spherical shaped member thereon and the other having a socket co-acting with the spherical shaped member, one of said pipe sections having an opening of larger diameter than the other and the one of smaller diameter having a tapered ring therein, in combination with a hose section connecting the pipe sections, said hose section having two parts formed of different diameters, the part of larger diameter being confined in the pipe section having the larger diameter and the part of smaller diameter being confined in the section having the tapered ring, and said section abutting against said tapered ring and being of greater length before insertion in the connection than the space into which it is compressed, whereby one of said pipe sections may move with respect to the other without stretching the hose section, and a ring located between the end of the pipe section of smaller diameter and the shoulder formed by the hose section of larger diameter.

10. In a pipe connection, two pipe sections connected to each other, one of said sections having an opening of larger diameter than the other, in combination with a hose section connecting said pipe sections together, said hose section having one part of larger diameter than the other forming a shoulder at the junction of the two parts, and a ring located between said shoulder and the free end of the other pipe section.

11. In a pipe connection, two pipe sections connected to each other, one of said sections having an opening of larger diameter than the other, in combination with a hose section connecting said pipe sections together, said hose section having one part of larger diameter than the other forming a shoulder at the junction of the two parts, and a ring located between said shoulder and the free end of the other pipe section, and said hose section being of greater length, before insertion in the connection, than the space into which it is compressed.

12. In a pipe connection, two pipe sections connected together, one having an opening therein of larger diameter than the other provided with a shoulder at its rear end, and the other pipe section having an abutment as the ring 32 in its interior, in combination with a hose section connecting said pipe sections together, said hose section having one part of larger diameter than the other, the part of larger diameter fitting into the pipe section having the shoulder therein, and the part of smaller diameter fitting into the pipe section having the abutment therein, and said hose section being of greater length, before insertion, than the distance between said shoulder and said abutment whereby the hose section is compressed when in position and permits one pipe section to move with respect to the other without stretching the hose section.

13. In a device of the character described, a pipe connection comprising a flexible joint adapted to be secured to a car, a second flexible joint located substantially at right angles to said first joint, a metallic pipe connecting said flexible joints, the first flexible joint permitting free movement in all directions and the second flexible joint permitting movement in at least two directions and a hose section inside of each of said flexible joints restrained laterally for substantially the entire length thereof, thereby making an air-tight connection and permitting free movement of the joints.

14. In a device of the character described, a pipe connection comprising a flexible joint adapted to be secured to a car, a second flexible joint located substantially at right angles to said first joint, a metallic pipe connecting said flexible joints, the first flexible joint permitting free movement in all directions and the second flexible joint permitting movement in at least two directions, and a hose section inside of each of said flexible joints, each of said hose sections being of greater length, before insertion, than the space they occupy, whereby the said hose section will not be unduly stretched when said flexible joints are bent.

15. In a device of the character described, a pipe connection comprising a ball and socket joint adapted to be secured to a car, a second joint located substantially at right angles to said ball and socket joint, a metallic pipe connecting said ball and socket joint and said second joint, the ball and socket joint permitting free movement in all directions and said second joint permitting movement in at least two directions and a hose section inside of each of said flexible joints restrained laterally for substantially the entire length thereof, thereby making an air-tight connection and permitting free movement of the joints.

16. In a device of the character described, a pipe connection comprising a ball and socket joint adapted to be secured to a car, a second joint located substantially at right angles to said ball and socket joint, a metallic pipe connecting said ball and socket joint and said second joint, the ball and socket joint permitting free movement in all directions and said second joint permitting movement in at least two directions, and a hose section inside of said ball and socket joint and said second joint, each of said hose sections being of greater length, before insertion, than the space they occupy, whereby said hose sections will not be unduly stretched at the points of bending.

In testimony whereof I affix my signature in presence of two witnesses.

WILLARD A. DODGE.

Witnesses:
ROBERT A. PLAISTED,
F. S. WOODBURY.